ns Patent [19]

Lee

[11] Patent Number: 4,518,183
[45] Date of Patent: May 21, 1985

[54] EXTENDIBLE SAFETY IMPACT BAGS FOR VEHICLES

[76] Inventor: Joseph K. Lee, 10616 Bramblebush Ave., Whittier, Calif. 90604

[21] Appl. No.: 583,751

[22] Filed: Feb. 27, 1984

[51] Int. Cl.³ .............................................. B60R 19/10
[52] U.S. Cl. .................................. 293/118; 293/134; 180/271
[58] Field of Search ............... 293/118, 117, 132, 134, 293/9; 180/271

[56] References Cited

U.S. PATENT DOCUMENTS

| | | | |
|---|---|---|---|
| 3,346,292 | 10/1967 | Lundman | 293/9 |
| 3,934,912 | 1/1976 | Ogihara | 293/134 |
| 3,947,061 | 3/1976 | Ellis | 293/134 |
| 4,192,538 | 3/1980 | Gulli | 293/134 |
| 4,411,462 | 10/1983 | Buehrig | 293/134 |

*Primary Examiner*—Robert R. Song

[57] ABSTRACT

A method and apparatus for preparing a moving vehicle for impending impact with another vehicle or object which incorporates the extending of the air bag to fill in the space between an extendible bumper. A detection apparatus senses a dangerous speed of the vehicle or an approaching object in the path of the vehicle and extends the bumper forwardly or rearwardly from the body of the vehicle while at the same time filling the space between the body and bumper with an inflated air bag. Should the impact not take place, or the dangers facing the vehicle have decreased, the apparatus retracts to its initial inoperative condition. One form incorporates a first filled bag which is filled at all times, and then a second bag which is inflated when the bumper is extended. A modified form moves an elongated bag into position with its longer dimension filling the space between the body of the vehicle and the bumper, and correspondingly returns the bag so that its shorter dimension fits in between the retracted bumper and the body of the vehicle.

17 Claims, 11 Drawing Figures

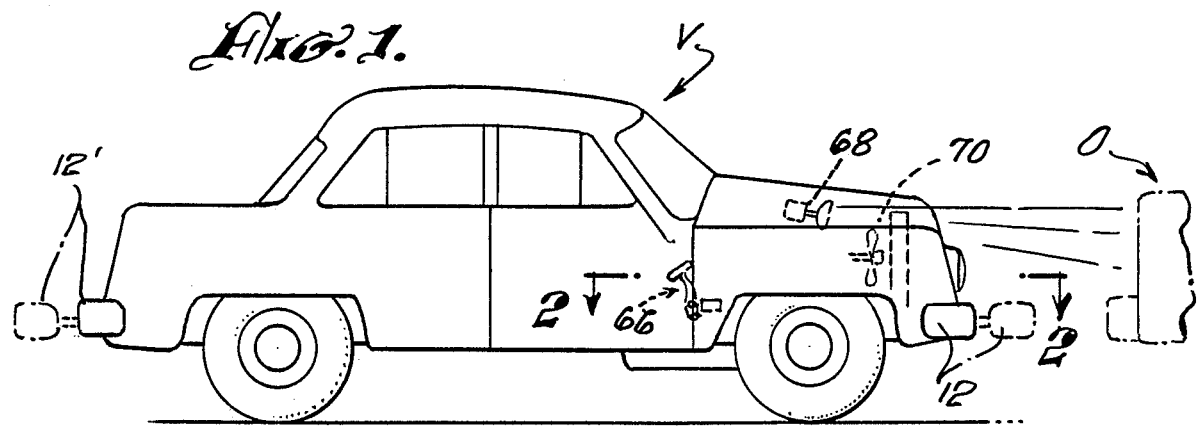
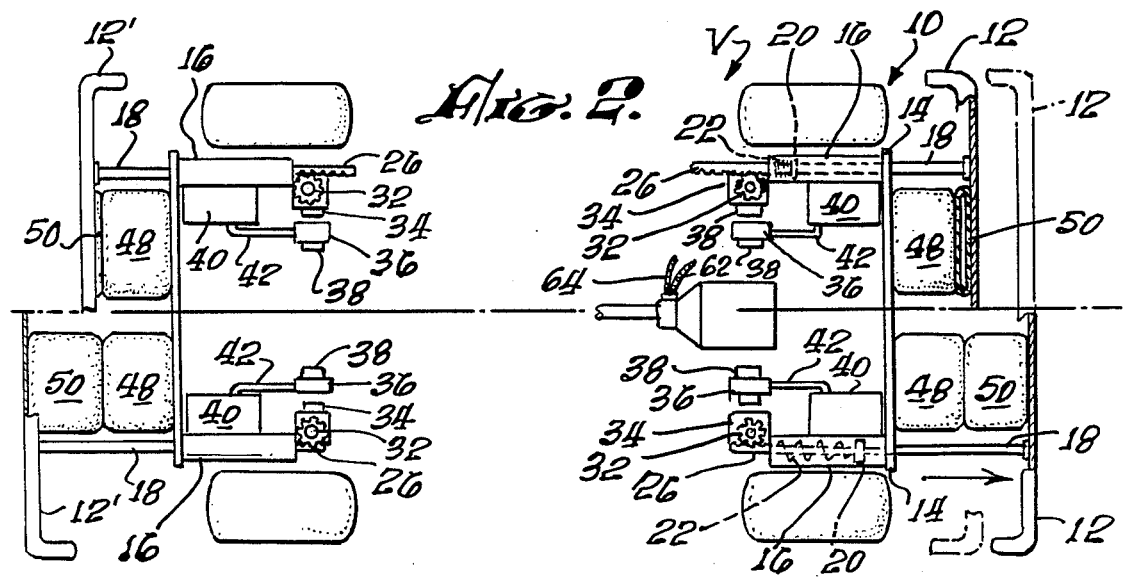
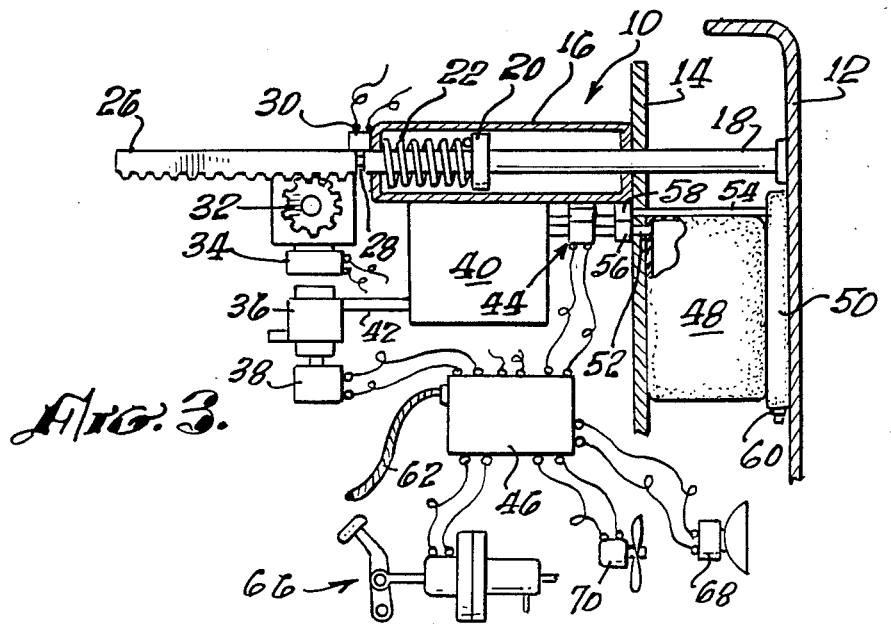

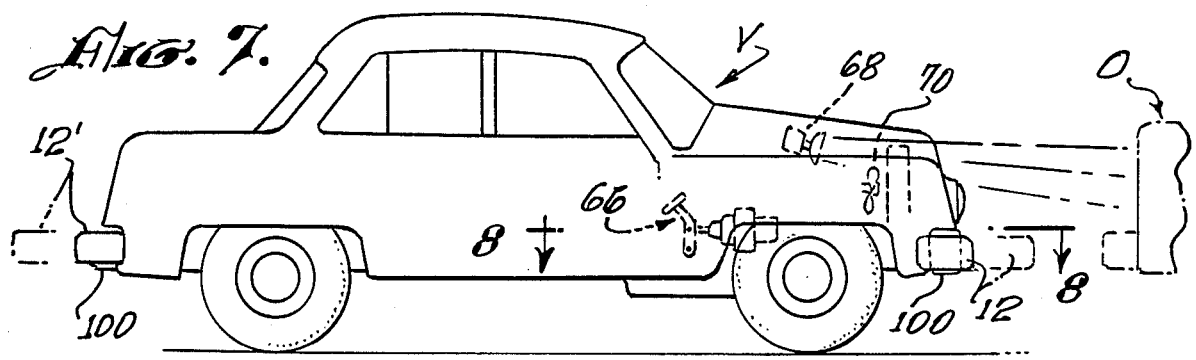
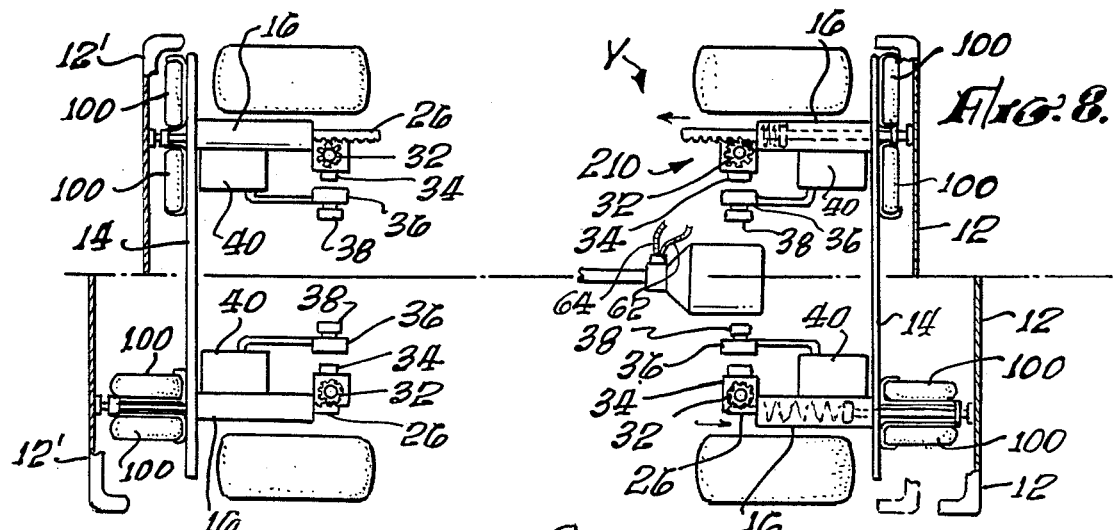
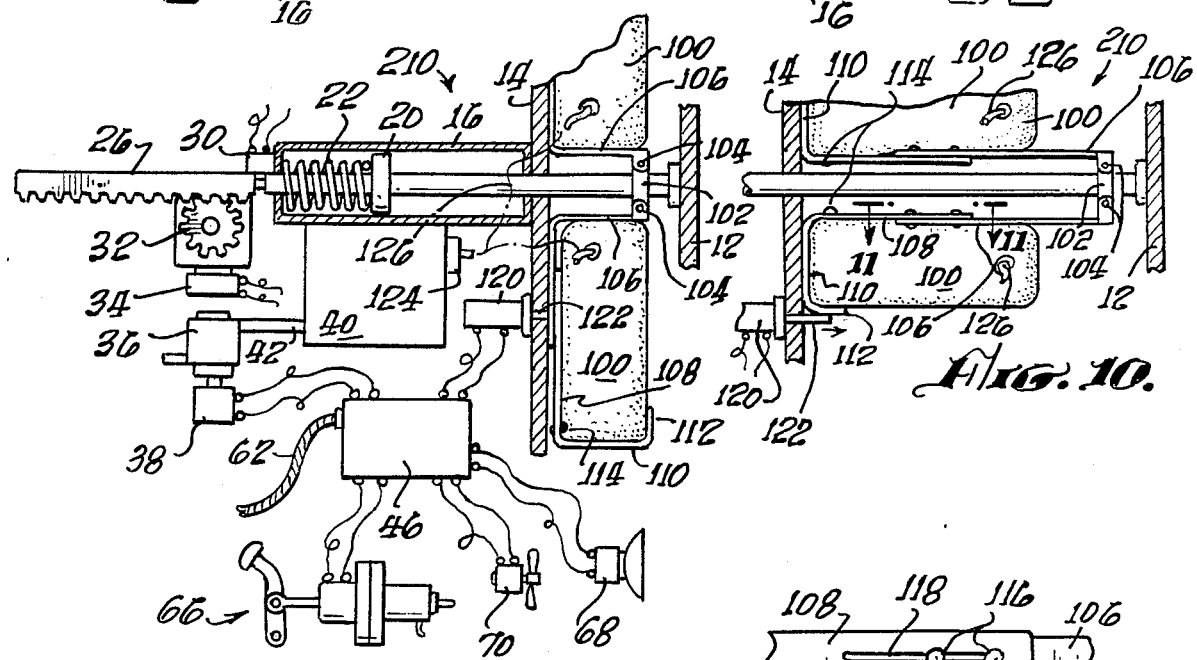

EXTENDIBLE SAFETY IMPACT BAGS FOR VEHICLES

CROSS REFERENCE TO RELATED PATENT APPLICATIONS

This application is related to Applicant's two pending patent applications inasmuch as they all relate to air-filled bags placed between the body of the vehicle and its bumper. These two applications are: SAFETY MECHANISM FOR IMPENDING VEHICULAR IMPACT, Ser. No. 353,079, filed on Mar. 1, 1982; and SAFETY APPARATUS AND METHOD FOR VEHICULAR IMPACT, Ser. No. 417,178, filed on Sept. 10, 1982.

BACKGROUND OF THE INVENTION

1. Field of the Invention

This invention is in the general field of safety air bags for vehicles, and more particularly to air bags placed between the body of the vehicle and its bumpers. More particularly, the invention relates to such air bags that can fill the void between extendible bumpers. Any dangerous condition, such as excessive speed, rapidly approaching object in the way of the moving vehicle, or excessive brake pedal action prepares such a bag for an impending impact.

2. Description of the Prior Art

There have been many attempts to alleviate the damaging and sometimes injurious effects of an impact between two vehicles or a vehicle and an object.

The most commonly known attempt to alleviate such a problem in recent times is the one in which the bumper is provided with a support means which "gives" upon impact. This allows the shock of such an impact to be partially absorbed. Although this type of device has been placed on the market, it is primarily used to keep the vehicle itself from sustaining too much damage during impact.

Other shock absorbing devices, such as U.S. Pat. No. 4,192,538 (Gulli) attempts to place a flexible air container between a pair of bumper members. In this method, the air container is constantly inflated for use and makes no possible provision for preparing the apparatus for use for an impending impact other than just deflating the bag during such impact.

Another U.S. Patent issued to Lundman, No. 3,346,292, pushes a bumper forward when an impact is suspected by the vehicle operator prior to a possible impact. No air bags are provided in this method to properly absorb such an impact, limiting the cushioning to a minimal amount.

Another apparatus, shown in German Pat. No. 2,309,139 issued to Baya Pena illustrates a piston-type of absorption apparatus. No air bags are used in this method.

Weman, U.S. Pat. No. 3,927,901, employs a continuous inflated air bag system surround the exterior of the body of a vehicle. No extendible bumpers are employed in his device.

All of the aforementioned devices have not been readily placed on the market because they have proved either too expensive to install, or they have not effectively solved the problem of first preparing the vehicle for impact, and for detecting such impending impact with another vehicle or object when the condition is indicated that would be injurious to the person in the vehicle or extensive damage being caused to the vehicle from such an impact.

SUMMARY OF THE INVENTION

Injury to passengers and operators of vehicles has long been of the greatest concern to manufacturers of such vehicles. Insurance companies have been also concerned at the mounting claims from such accidents occuring from impact between vehicles and objects. Governmental safety agencies have been established in order to forward some suggestions and laws to further solve the growing problem.

Commercial vehicles, such as delivery carts, towmotors, and even such vehicles as recreational rides, and the like, have recently experienced quite a large amount of damage and injury to passengers and operators of such vehicles.

I have worked for many years in such a field as described above, and have come up with some simple and inexpensive methods and devices to accomplish the task of reducing such damages and injuries.

I have provided a vehicle with the method and apparatus for anticipating an oncoming danger to the passengers of the vehicle, and have provided the methods and apparatus for effecting such preparation to certain mechanisms that will further prepare the vehicle for such an impending impact.

It is an object of this invention to provide apparatus and methods for anticipating a speed of the vehicle that is in excess allowable to keep injury and damage to a minimum.

It is a further object of this invention to provide means and apparatus for extending the bumpers of the vehicle outwardly from the vehicle to accept a shock of an impact with another vehicle or an object.

Yet a further object of this invention is to provide a means for retracting the bumpers of a vehicle after the danger of impending impact has passed.

Another object of this invention is to provide an inflated safety air bag between the body of a vehicle and its bumper and a method and apparatus for extending the air bag to a further position with the bumper is extended outwardly from the vehicle, keeping an inflated air bag in condition and position to accept an impact with another vehicle or object.

It is yet a further object of this invention to provide an anticipation of possible impact which incorporates a method and apparatus for detecting a speed of the vehicle that could cause injury or damage if impact took place, such detection apparatus being including a radar device scanning ahead for objects; triggering the bumper and airbag assembly into operation if excessive brake pressure is applied by the operator; sensing a flow of air past the vehicle that indicates to such a flow detector that the vehicle is traveling at a speed in excess of that necessary to avoid damage or injury from an impact; and a sensing mechanism directly connected between the speedometer and transmission to indicate when such a damaging or injurious speed is being experienced.

These and other objects of this method and apparatus of my invention will become apparent to those skilled in the art upon reading the description of a preferred embodiment which follows, in conjunction with a review of the appended drawings.

BRIEF DESCRIPTION OF THE DRAWINGS

FIG. 1 is a simplified side elevation of a vehicle which is equipped with apparatus for practicing the methods incorporated in the invention;

FIG. 2 is a schematic plan view of the apparatus of FIG. 1 as it is viewed along line 2—2 of FIG. 1;

FIG. 3 is an enlarged fragmentary view of a portion of FIG. 2 showing the safety apparatus in a retracted condition;

FIG. 7 is a view similar to FIG. 1 but showing an alternate embodiment of safety apparatus and system;

FIG. 8 is a schematic plan view of the apparatus as viewed along line 8—8 of FIG. 7;

FIG. 9 is an enlarged fragmentary view of a portion of FIG. 8 showing the safety apparatus of FIGS. 7 and 8 in a retracted condition;

FIG. 10 is a fragmentary view similar to FIG. 9 but showing the apparatus in an extended condition preparatory for impact, or impending impact; and FIG. 11 is a fragmentary view as viewed along line 11—11 of FIG. 10 showing a connection detail.

DESCRIPTION OF A PREFERRED EMBODIMENT

Figure 4:
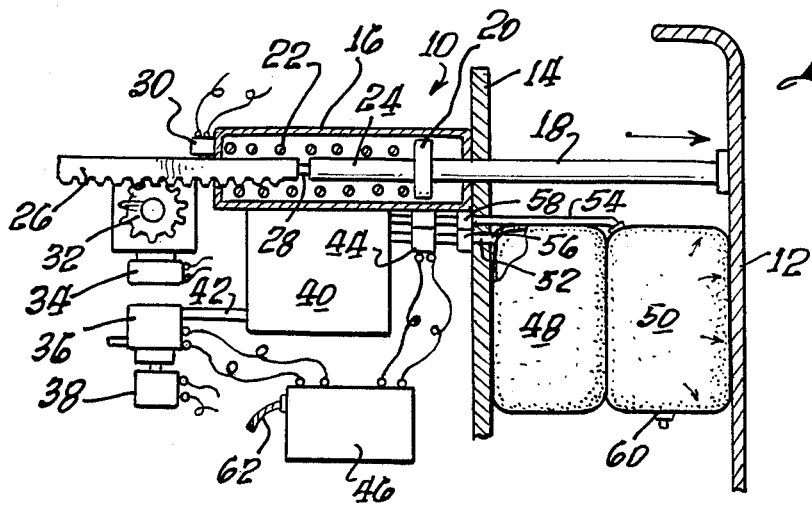
FIG. 4 is a view similar to FIG. 3 in which the apparatus is in an actuated and extended condition preparatory to a possible impact.

The invention, as indicated in the side elevation of FIG. 1, is housed within a vehicle V. The vehicle V is shown moving along a road, or the like, and in close proximity to another vehicle or object O.

FIG. 2 shows the safety apparatus 10, generally, as it is incorporated in the vehicle V and attached to forward and rearward bumpers 12 and 12' through a connection means cooperating with a frame plate 14.

FIG. 2, at its right hand end, shows an upper portion that illustrates the safety apparatus in a retracted, inoperative condition, while the lower portion of the right hand end of the Figure illustrates the safety apparatus of the invention in an extended condition. The Figure is divided in this manner to show in a simplified form the general operation of the method of the invention.

Cylinders 16, being attached fixedly to the frame 14, have piston rods 18 and pistons 20 cooperating to form an extendible connection and support for the bumpers 12 and 12'. Springs 22 normally urge the piston 20 outwardly to force the bumpers to their outermost position.

An extension of the piston rod 18, in each case, passes through the rear of the cylinder 16 and has an integrally formed rack 26 attached thereto. A groove 28 is formed on the extension 24 in order to accomadate a solenoid actuated latch mechanism 30. This latch mechanism is controlled by a control console which will be described later in this application.

Pinion 32, operated by motor 34, moves the rack 26 back into a retracted inoperative position when and if the safety method of the invention indicates that there is no danger of impending impact with another object by the vehicle incorporation the safety apparatus. This retraction also takes place if the speed of the vehicle has returned to a normal safe level somewhere in the range of 15 miles per hour or less. Motor 34 is reversible.

The motor 38 is shown for operating an air pump 36 which supplements an air reservoir 40. This second motor can also be integrated with the motor 36 in a manner which can operate both jobs. Shown is a conduit 42 interconnects the pump with the reservoir.

A solenoid operated valve arrangement 44 controls the flow of air into one-way valves 56 and 58 and this control is effected by the master control console 46. It is well known in the art as to how to have such a control console.

Air bags 48 and 50 are provided in the area between the frame 14 and the bumper 12. The air bag 48 is always filled with air and is attached to the frame 14. Air bag 50 is normally deflated during most conditions and is hurriedly inflated when the bumper is extended forwardly to an anticipated impact situation. Lines 52 and 54 provide a connection between the bags 48 and 54 with their respective solenoid valves 44.

If an impact is accomplished with another object or vehicle, exhaust valve 60 allows the air bag 50 to be deflated in a metered manner while absorbing the shock of the impact.

A second speedometer cable 62 which is connected to the transmission alongside the conventional cable 64 is shown leading into the control console unit 46 and brings a reading of actual speed of the vehicle to the control console for purposes of determining whether the speed is in excess of that desired to maintain the safety apparatus in a condition normally inoperative until necessary.

Another safety feature of my method is to be sure that the extension takes place of the bumpers. Severe actuation of the brake mechanism will start the bumper extension and the bag inflation that prepares the vehicle for possible impact. This braking method is shown in the previously mentioned patent issued to me and in the pending applications of mine. The brake is shown in FIG. 1 at 66. The radar detector, as is similar to those shown in issued patents and is well known in the art, is shown at 68 and is interconnected through the control console to activate the preparatory safety system. Also, I have shown in FIG. 1, that the fan, or supplementary fan blade apart from the cooling fan, can be incorporated into the system to detect when the flow of air is passing through the vehicle at a rate that would determine that the vehicle is traveling at an unacceptable safe speed. This detector fan 70 can be on the order of a pinwheel construction and can be placed alongside the engine immediately behind the radiator or alongside it.

Figure 5:
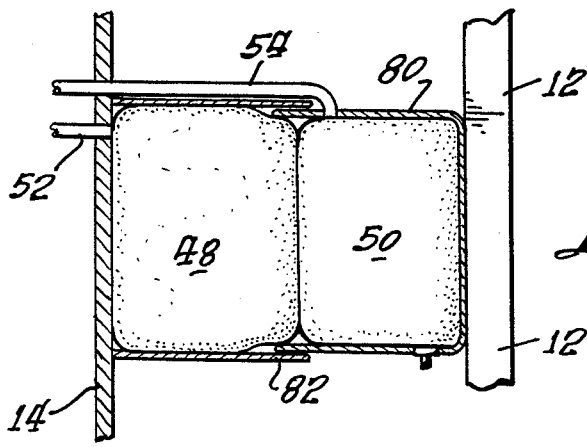
FIG. 5 is an enlarged fragmentary section of the air bags employed in the safety apparatus of FIGS. 1 through 4 showing an alternate embodiment of the invention.
Figure 6:
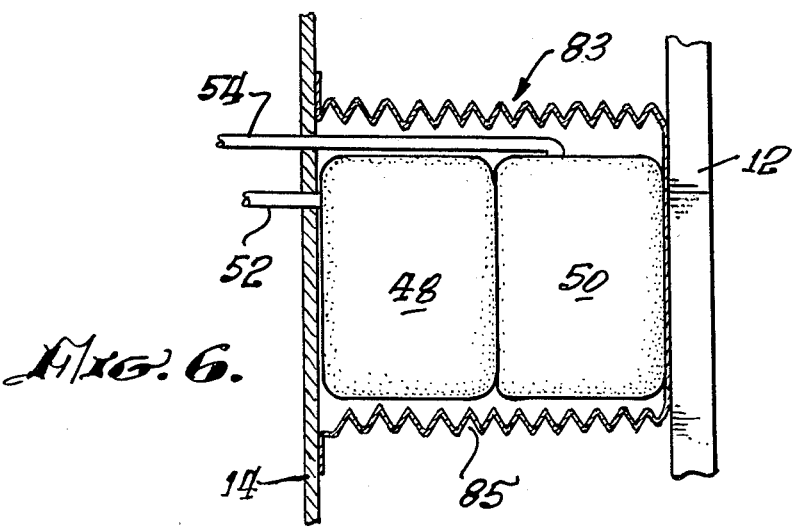
FIG. 6 is another alternate embodiment of the invention showing another method of protecting the air bags from wear and damage during the life of the invention.

FIG. 5 indicates that the air bags 48 and 50 can be surrounded by a shroud of a protective material such as aluminum, or the like, and the segments 80 and 82 can nest with one another during the extending of the bumper from the frame. Should impact take place, these covers can be fractured easily and then later replaced econimically. FIG. 6 shows an accordian-like cover 83 with ribs 85.

The alternate embodiment of FIGS. 7 through 11 shows another method of filling the space between an extended bumper and the frame of the vehicle, while still being able to be moved back from such an extended position if there is no danger of impending impact.

In this arrangement, the bag 100 is inflated at all times, and and can be injected with more air through a solenoid valve 124 on the reservoir 40 and conduits 126.

The bags 100 are shown connected to a fixed collar 102 by pivotal connections 104. The collar is affixed to the extendible rod 18 as was shown in the earlier embodiment of FIGS. 1 through 4. All of the components that show similar reference numerals are shown in FIGS. 7 through 10 that are identical to the components of FIGS. 1 through 4.

A flexible strip 106 is shown in FIGS. 8 through 11 as being pivotally affixed at one end to the collar 102 and is interconnected by a frictionally slidable arrangement to a rigid strip 108. This rigid strip has a base portion 110 and an upturned portion 112. The bag 100 is placed into the cradle arrangement and is affixed to the strip 108 at 114.

The slidable and frictional connection between the strips 106 and 108 is shown in FIG. 11. Fasteners, such as rivets, or the like, are shown at 116 and affixed to the strip 106. An elongated slot 118 is formed in the strip 108 and allows the rivets to move along the slot when an impact with another object forces the bumper 12 into an inward direction toward the frame 14.

A solenoid 120 is shown attached to the rear of the frame member 14 and has a latching member 122 passing through an opening in the frame. This latching member is located in such a position so as to retain the bag holder, or cradle, in the condition of FIG. 10 during an impact situation and thus prevents the bag and cradle from being forced to return to its initial position of FIG. 9.

The operation of this alternate embodiment allows a bag or series of bags to be placed between the bumper and frame of a vehicle housing the safety device of the invention without employing the dual layer bag method of FIGS. 1 through 6. In certain situations this method and apparatus may be preferable over existing systems.

While the embodiments of this invention shown and described are fully capable of achieving the objects and advantages desired, it is to be understood that such embodiments have been shown and described soley for the purposes of illustration and not for the purposes of limitation.

I claim:

1. The method of intercepting an object in the path of a passenger vehicle during impact between said object and passenger vehicle while said vehicle is traveling at a predetermined unsafe impact speed which comprises:
   a. Providing a detection means on said moving vehicle that anticipates a possible impending impact with an object in the path of said moving vehicle or an object coming upon said vehicle from behind;
   b. Inserting a forwardly or rearwardly extending mechanism within the frame of said vehicle for actuating an extension procedure of the bumpers of said vehicle prior to an impending impact of said vehicle as determind by said detection means;
   c. Providing a releasable retaining apparatus for keeping said extending mechanism either from being actuated from an initial retracted condition or for keeping said retaining apparatus in an extended condition when it has been moved into that position while preparing for possible impending impact with another object;
   d. Placing a dually compartmented impact shock absorbing air cusioning apparatus at either front or back, or both, of said moving vehicle between said frame of said vehicle and the bumpers of said vehicle;
   e. Providing air filling and air extracting means for both compartmented air bags and for controlling the amount of air in the second outwardly placed bag when it is determined that the vehicle is either in or out of danger of possible impact; and
   f. providing a retracting mechanism for returning the bumpers of the vehicle to an initial inoperative condition if no impact is detected imminent, or if no impact takes place.

2. The method as claimed in claim 1 in which said detection apparatus comprises a radar arrangement or other proximity detecting device.

3. The method as claimed in claim 1 wherein a predetermined unsafe impact speed is determined by a reading detected from the speedometer cable of the vehicle.

4. The method as claimed in claim 1 wherein the predetermined unsafe impact speed is determined by an air flow detection apparatus at the forward end of said vehicle.

5. The method as set forth in claim 1 wherein said air cushion apparatus is provided with a protective covering.

6. An apparatus for intercepting an object in the path of a passenger vehicle during impact with said object and passenger vehicle while said vehicle is traveling at a predetermined unsafe impact speed which comprises:
   a detection means on said moving vehicle that anticipates a possible impending impact with an object in the path of said moving vehicle or with an object coming upon said vehicle from behind;
   a forwardly or rearwardly extending mechanism within a frame of said vehicle for actuating an extension procedure of the bumpers of said vehicle prior to an impending impact of said vehicle as determined by said detection means;
   a releasable retaining apparatus for keeping said extending mechanism either from being actuated from an initial retracted condition or for keeping said retaining apparatus in an extended condition when it has been moved into that position while preparing for possible impending impact with another object;
   a dually compartmented impact shock absorbing air cushioning apparatus at either front or back, or both, of said moving vehicle at a point between said frame of said vehicle and bumpers of said vehicle;
   air filling and air extracting means for filling or emptying said air cushioning apparatus; and
   a retracting mechanism for returning the bumpers of the vehicle to an initial inoperative condition if no impact is detected to be imminent, or if no impact takes place.

7. The apparatus of claim 6 in which said detection apparatus is a radar arrangement or other proximity detecting device.

8. The appartus of claim 6 wherein a predetermined unsafe impact speed is determined by a reading detection from the speedomoter cable of the vehicle.

9. The apparatus as claimed in claim 6 wherein the predetermined unsafe impact speed is determined by an air flow detection apparatus located at the forward end of said vehicle.

10. The apparatus as claimed in claim 6 wherein said air cushion means is provided with a protective covering.

11. The apparatus as claimed in claim 6 wherein the impending impact is determined by an excessive pressure on the brake pedal of the moving vehicle.

12. The method as set forth in claim 1 whrein a sensing device is actuated by excessive brake pressure of the moving vehicle in order to prepare the vehicle for possible impending impact and said sensing device is placed on said vehicle.

13. The method of intercepting an object in the path of a moving passenger vehicle during impact or impending impact and for preparing such vehicle for such impact while said vehicle is traveling at a predetermined unsafe impact speed which comprises:
   a. providing a detection means on said moving vehicle that anticipates a possible impending impact with an object in the path of said moving vehicle or with an object coming from behind;
   b. inserting a forwardly or rearwardly extending mechanism within the frame of said vehicle for actuating an extension procedure of the bumpers of said vehicle prior to an impending impact of said vehicle as predetermined by said detection means;
   c. providing a releasable retaining apparatus for keeping said extending mechanism either from being actuated from an initial retracted condition or for keeping said retaining apparatus in an extended condition when it has been moved into that position while preparing for possible impending impact with another object;
   d. placing at least one elongated air bag between said bumper and said frame of said vehicle wherein the longer dimension of said elongated bag is parallel with said frame and said bumper when said extending apparatus is in a retracted condition;
   e. pivotally attaching said elongated air bag at its end closest to said extending mechanism;
   f. providing a cradle arrangement at the other end of said elongated air bag;
   g. interconnecting said pivotally attached end and said cradle with a frictionally secured pair of connectors;
   h. attaching said air bag to said cradle;
   i. providing a latching device for retaining said elongated air bag from returning to its parallel position to said frame; and
   j. providing a retracting mechanism for retracting said bumpers to an inactive condition.

14. The apparatus as set forth in claim 13 wherein said detection apparatus is a radar arrangement or other proximity detection device.

15. Apparatus as set forth in claim 13 wherein a predetermined unsafe speed is determined by a reading from the sppeedometer cable of the vehicle.

16. Apparatus as set forth in claim 13 wherein the predetermined unsafe speed is accomplished by a reading from an air flow detection apparatus located at the forward end of said vehicle.

17. Apparatus as set forth in claim 13 wherein said elongated air bag is filled from a reservoir located within the frame area of said vehicle.

* * * * *